(12) United States Patent
Meyer et al.

(10) Patent No.: US 11,779,932 B2
(45) Date of Patent: Oct. 10, 2023

(54) CRUSHER

(71) Applicant: Kleemann GmbH, Göppingen (DE)

(72) Inventors: Gerd Meyer, Amstetten (DE); Rainer Teichert, Haan (DE); Jochen Meier, Hülben (DE)

(73) Assignee: Kleemann GmbH

(*) Notice: Subject to any disclaimer, the term of this patent is extended or adjusted under 35 U.S.C. 154(b) by 191 days.

(21) Appl. No.: 17/325,455

(22) Filed: May 20, 2021

(65) Prior Publication Data
US 2021/0370308 A1 Dec. 2, 2021

(30) Foreign Application Priority Data

May 26, 2020 (DE) ...................... 10 2020 114 106.8

(51) Int. Cl.
*B02C 1/00* (2006.01)
*F16K 17/08* (2006.01)
(Continued)

(52) U.S. Cl.
CPC .............. *B02C 1/005* (2013.01); *B02C 1/025* (2013.01); *B02C 13/095* (2013.01); *F16K 17/082* (2013.01)

(58) Field of Classification Search
CPC ......... B02C 13/095; B02C 1/005; B02C 1/02; B02C 13/31; B02C 23/04; F16K 17/082
See application file for complete search history.

(56) References Cited

U.S. PATENT DOCUMENTS 4,192,343 A 3/1980 Grahac
4,729,517 A 3/1988 Krokor et al.
(Continued)

FOREIGN PATENT DOCUMENTS

DE 1148433 B 5/1963
DE 2749812 A1 5/1979
(Continued)

OTHER PUBLICATIONS

Translation of EP-0019541 (Year: 1980).*
(Continued)

*Primary Examiner* — Bobby Yeonjin Kim
(74) *Attorney, Agent, or Firm* — Lucian Wayne Beavers; Patterson Intellectual Property Law, PC (57) ABSTRACT

The invention relates to a crusher, in particular a rotary impact crusher, cone crusher or jaw crusher, having a crusher unit (10), which has a movable first crusher body (11), in particular a rotor or a crusher jaw, wherein a second crusher body (14), in particular an impact rocker or a crusher jaw, is assigned to the first crusher body (11), wherein a crushing gap (15) is formed between the crusher bodies (11, 14), wherein an overload triggering device (30) is coupled to the first crusher body or to the second crusher body, which overload triggering device has a hydraulic cylinder (20) and which overload triggering device is designed to permit a motion of the coupled crusher body (11, 14) increasing the width of the crushing gap (15), wherein the hydraulic cylinder (20) has a pressure chamber (24), which is delimited by means of a piston (23), and wherein the overload triggering device (30) has a pressure valve (31) which, in its open position, establishes a fluid-conveying connection between the pressure chamber (24) and a low-pressure area and, in the closed valve position, blocks this connection. The productivity and operational safety of such a crusher can then be increased if provision is made that the overload triggering device (30) has a high-pressure valve (40), which, as a result of an overload situation, in its open position establishes a fluid-conveying connection between the pressure chamber (24) of the hydraulic cylinder (20) and a low-pressure area and, after the overload situation has ended, is moved into a closed position to block this connection, and in that the triggering pressure required to open (Continued)

the pressure valve (31) is lower than the triggering pressure required to open the high-pressure valve (40).

22 Claims, 6 Drawing Sheets

(51) Int. Cl.
*B02C 1/02* (2006.01)
*B02C 13/09* (2006.01)

(56) References Cited

U.S. PATENT DOCUMENTS

2007/0069053 A1* 3/2007 Ortoncelli ............. B02C 13/095
241/189.1
2014/0151482 A1* 6/2014 Solomon ............... B02C 13/095
241/286
2015/0107323 A1 4/2015 Traina et al.

FOREIGN PATENT DOCUMENTS

| DE | 3525101 A1 | 1/1987 | |
|----|---|---|---|
| DE | 19727003 A1 | 1/1999 | |
| DE | 102017002079 B4 | 3/2019 | |
| EP | 0019541 A1 * | 5/1980 | ........... B02C 13/095 |
| EP | 0019541 B1 | 11/1982 | |
| WO | WO-2017093407 A1 * | 6/2017 | ........... B02C 13/095 |

OTHER PUBLICATIONS

Translation of WO-2017093407 (Year: 2017).*
Office action in corresponding German 10 2020 114 116.8, dated Jan. 18, 2021, 12 pages (not prior art).

* cited by examiner

CRUSHER

BACKGROUND OF THE INVENTION

1. Field of the Invention

The invention relates to a crusher, in particular a rotary impact crusher, cone crusher or jaw crusher, having a crusher unit, which has a movable first crusher body, in particular a rotor or a crusher jaw, wherein a second crusher body, in particular an impact rocker or a crusher jaw, is assigned to the first crusher body, wherein a crushing gap is formed between the crusher bodies, wherein an overload triggering device is coupled to the first crusher body or to the second crusher body, which overload triggering device has a hydraulic cylinder and which overload triggering device is designed to permit a motion of the coupled crusher body increasing the width of the crushing gap, wherein the hydraulic cylinder has a pressure chamber, and wherein the overload triggering device has a pressure valve, which, in its open position, establishes a fluid-conveying connection between the pressure chamber and a low-pressure area and, in the closed valve position, blocks this connection.

2. Description of the Prior Art

From DE 10 2017 002 079 B4 an impact crusher is known, in which a variable crushing gap is adjusted between a rotatable rotor and an impact rocker. In normal crushing operation, a material feeder is used to feed the material to be crushed to the rotor. The rotor flings the material against the impact rocker. The resulting forces cause the rock material to break. The rock material is thus crushed to the desired particle size and can fall out of the crusher housing through the crushing gap. It may however happen that unbreakable bodies are fed into the rotor. For instance, iron parts. This is a critical overload situation for the impact crusher. In particular, there is a risk of damage to the crusher in the process. To render such an overload situation controllable, a piston-cylinder unit is coupled to the impact rocker. It can be used to alter the position of the impact rocker and thus the width of the crushing gap. The piston-cylinder unit includes a gas spring against which the impact rocker rests.

In normal crushing operation, the width of the crushing gap is set to the desired dimension. In the event of a critical overload, the gas spring can be compressed, causing the impact rocker to move out of the way. In this way, the crushing gap can be enlarged in a pulse-like manner. The unbreakable body can then fall through the crushing gap. Subsequently, the width of the crushing gap is re-adjusted to the desired dimension.

The gas spring proposed in DE 10 2017 002 079 B4 introduces elasticity into the support of the impact rocker. During crushing, the forces will vary in a certain permissible degree due to different hardness and different size of rocks. In response to these changing forces the elastic gas spring causes a constant variation of the crushing gap and thus of the grain size of the crushed material, which is undesirable.

From EP 0 019 541 B1 an impact mill is known in which the crushing gap can be adjusted via a hydraulic damper. The hydraulic damper has a piston to which a piston rod is coupled. The piston can be adjusted in a cylinder chamber. The piston rod is connected to the impact rocker. An overload valve is provided in case of an overload situation. If a non-crushable body enters the crushing chamber, the overload valve is triggered. It increases the size of the crushing gap and the non-crushable body can fall out of the crushing chamber.

In crushers, in particular in rotary impact crushers, as has already been indicated above, rock material of different size and different hardness is frequently fed into the crusher unit during normal crushing operation. The rotary impact crusher can deal with these rock materials and crush them. In this respect, such an uncritical case has to be distinguished from a critical overload situation, in which a non-crushable body enters the area of the crusher unit.

That, however, is impossible for the known rotary impact crushers. In particular, for safety reasons, the overload triggering device is set in such a way that it triggers in an uncritical load case, although that is not yet required. This behavior degrades the effectiveness of the crushing process. In particular, it always takes a certain amount of time for the crusher unit to be properly reset after a trip has occurred.

SUMMARY OF THE INVENTION

The invention addresses the problem of providing a crusher of the type mentioned above, which permits an effective crushing operation.

This problem is solved by the overload triggering device having a high-pressure valve which, as a result of a critical overload situation, in its open position establishes a fluid-conveying connection between the pressure chamber of the hydraulic cylinder and a low-pressure area and, after the overload situation has ended, is moved into a closed position to block this connection, and by the triggering pressure required to open the pressure valve being lower than the triggering pressure required to open the high-pressure valve.

If short load peaks occur during crushing operation, for instance caused by a large lump of rock in the crushing chamber, this represents a permissible load situation the crusher unit can deal with. In this case, the crushing gap has to be enlarged only slightly to avoid excessive stress on the crusher unit. The large lump of rock can then be crushed and the crushed material has a coarser grain for a brief period. Incidentally, the crushing gap setting can be kept constant even for widely varying loads in the crushing chamber.

If a non-crushable body, for instance an iron block, enters the crushing chamber, a high load peak results. The overload triggering device can then react using the coupled high-pressure valve. In this way, the efficiency of the crusher and its operational safety are significantly improved in a simple way.

According to a preferred variant of the invention, provision may be made that the trigger pressure required to open the pressure valve is 100 bar, and that the trigger pressure required to open the high-pressure valve is 200 bar.

The inventors recognized that in crushers, in particular in rotary impact crushers, uncritical overload situations can result in a pressure in the hydraulic cylinder in the range from 40 bar to 100 bar. Accordingly, the trigger pressure for opening the pressure valve can be set to less than 100 bar. Particularly advantageously, provision may be made to limit the pressure in the hydraulic cylinder to a range from 50 bar to 65 bar by means of the pressure valve. In this way, the most common crushing tasks can be performed in an optimum manner. In contrast, the required trigger pressure for the high-pressure valve should be set to >150 bar to safely control a critical overload situation. Preferably, the triggering pressure in the hydraulic cylinder should be greater than 200 bar, greater than 250 bar, greater than 300 bar or greater than 350 bar, depending on the design of the crusher.

Crushers having a comparatively small crushing capacity tend towards smaller pressure values and crushers having a larger crushing capacity tend towards higher triggering pressures.

In a particularly preferred embodiment of the invention, the crusher body coupled to the hydraulic cylinder is adjusted in such a way that for an open pressure valve a first increase in width of the crushing gap results, the crusher body coupled to the hydraulic cylinder is adjusted in such a way that a second increase in width of the crushing gap results for an open high-pressure valve, and the first increase in width is smaller than the second increase in width, wherein provision is preferably made that the ratio of the first increase in width to the second increase in width is 0.5, particularly preferably 0.25.

For such a design of the crusher, its effectiveness is further improved. In the case of an uncritical overload situation, the crushing gap is only slightly increased to safely control it. After the non-critical overload situation has ended, the slightly enlarged crushing gap can be quickly regulated back to the required size. In a critical overload situation, on the other hand, the crushing gap has to be widely opened in a very short time to prevent the crusher unit from damage.

A crusher according to the invention may in particular be designed such that, as a result of opening the first pressure valve, a first quantity of hydraulic fluid enters the low-pressure area through the fluid-conveying connection, that, as a result of the opening of the high-pressure valve, a second quantity of hydraulic fluid enters the low-pressure area through the assigned fluid-conveying connection, and that the first quantity is smaller than the second quantity, wherein provision is preferably made that the ratio of the first quantity to the second quantity is 0.5, more preferably 0.25. This simple measure can be used to set the crushing gap to different sizes in the two overload situations (non-critical overload and critical overload).

If provision is made that the overload triggering device is connected to a hydraulic circuit and that the hydraulic fluid discharged via the fluid-conveying connection of the high-pressure valve is fed into the hydraulic circuit via a connecting line, then the hydraulic fluid can be reused in the case of a critical overload. It can then be pumped back into the piping of the hydraulic circuit, for instance using a pump.

According to a possible variant of the invention, provision may be made that the high-pressure valve comprises a piston that can be adjusted between the closed position and the open position against the preload of a spring, and that the piston comprises a pressure piece, which, in the closed position, is pressed against a valve seat by a spring preload in a sealed manner. The spring can be used to set the trigger pressure required to open the valve. A kit can also be designed in this way, using different springs having different spring stiffnesses. By selecting the appropriate spring, the trigger pressure and the triggering characteristics of the high-pressure valve can be determined, and in this way the valve can be designed for the particular type of crusher.

A possible variant of the invention can be designed such that the piston has at least one first pressure surface and at least one second pressure surface, that in the closed position of the high-pressure valve the hydraulic pressure present in the pressure chamber of the hydraulic cylinder pressurizes the pressure surfaces, that the projections of the first pressure surfaces and the second pressure surfaces form a first and a second projected surface in a plane perpendicular to the preloading direction of the spring, wherein the surface normal to the first projected surface extends opposite from the direction of the opening motion of the piston, and the surface normal to the second projected surface extends in the direction of the opening motion of the piston, and in that the area of the first projected surface is greater than the area of the second projected surface.

The high pressures can be safely controlled for such a design of the high-pressure valve. The closing pressure is determined by the preloading force of the spring and the force resulting from the difference of the projected surfaces multiplied by the applied pressure. A suitable selection of the surface difference can result in a relatively soft spring being used to hold the high-pressure valve securely in the closed state. This significantly simplifies the design effort for the high-pressure valve. In addition, soft springs, such as helical springs, can be used to easily achieve flat spring characteristics. These permit a long adjustment travel of the piston against a relatively weak spring force. Accordingly, the high-pressure valve can open quickly and fully when a trigger pressure is applied, i.e., the hydraulic fluid can exit the hydraulic cylinder in a short period of time. The critical overload situation can be safely controlled in this way.

Within the scope of the invention, provision may in particular be made that not only a first pressure surface and/or a second pressure surface is present. Rather, multiple first and/or multiple second pressure surfaces may also be provided. The projections of these multiple pressure surfaces then result in a first total projected surface with a surface normal in the direction of the opening motion of the piston and a second total projected surface with a surface normal against the direction of the opening motion of the piston. The area of the first total projected surface is then larger than the area of the second total projected surface.

According to the invention, provision can also be made that the piston has a first pressure surface or first pressure surfaces, that in the closed position of the high-pressure valve the hydraulic pressure present in the pressure chamber of the hydraulic cylinder pressurizes the pressure surface or pressure surfaces, that the projection of the first pressure surface(s) in a plane perpendicular to the preloading direction of the spring forms a first projected surface, wherein the surface normal to this first projected surface extends opposite from the direction of the opening motion of the piston, that the piston has at least one third pressure surface, that the projection of the third pressure surface(s) in a plane perpendicular to the preloading direction of the spring forms a third projected surface, wherein the surface normal to this third projected surface extends in the direction opposite from the direction of the opening motion of the piston, that in the closed position of the high-pressure valve the hydraulic pressure in the pressure chamber of the hydraulic cylinder is not present at the third pressure surface, and that a spatial connection is established between the third pressure surface and the pressure chamber in the open valve position.

When the high-pressure valve is closed, the pressure in the pressure chamber of the hydraulic cylinder pressurizes the first pressure surface. When the high-pressure valve trips in a critical overload situation, the piston is displaced towards its opening direction. The area upstream of the third pressure surface then also comes into spatial contact with the pressure chamber. In this way a high pressure is exerted on this third pressure surface. As a result of this high pressure, in the opening direction of the piston an additional force is generated at the third pressure surface. This force therefore adds to the opening force for adjusting the piston. As soon as this force becomes effective, there is an additional acceleration of the piston, contributing to a short opening time. This ensures a fast opening of the high-pressure valve in the event of a critical overload situation. The hydraulic fluid can quickly flow out of the hydraulic cylinder and the crusher body can be adjusted to quickly open the crushing gap.

According to the invention, provision can also be made that the piston of the high-pressure valve has a penetration, which is designed in particular as a drilled hole, and which penetration establishes a spatial connection between the area upstream of the first pressure surface and the fluid area upstream of the second pressure surface. The spatial connection between the two pressure surfaces is established, at least in some areas, via the piston. It can be easily machined accordingly.

A particularly compact design can be achieved if provision is made that the piston of the high-pressure valve has a support section onto which the spring, which is designed as a helical spring, is pushed, that the piston has a shoulder supporting one end of the spring, and that the other end of the spring is supported on a spring holder, which is part of a valve body into which the piston is inserted. The spring is also secured against buckling at the support section.

One conceivable embodiment of the invention is such that the piston of the high-pressure valve has a guide section, which is preferably guided on an inner wall of a guide body in a sealed manner.

A crusher according to the invention can be designed such that the valve seat for the piston is formed by a valve piece of the guide body, which is preferably designed in the form of a bushing, that the guide body is inserted into a mount of a valve body of the high-pressure valve, and that the guide body forms at least one line section through which the hydraulic medium flows out of the pressure chamber in the open position of the high-pressure valve. The guide body can be easily manufactured as a separate component. Accordingly, the valve seat can be machined to precisely match the guide body.

To achieve a compact design of the high-pressure valve, provision can also be made that the guide body has an inner wall spaced apart from the support section of the piston, and that the spring is mounted in the spaced-apart area.

According to the invention, provision can also be made, for instance, that the high-pressure valve has a coupling piece and a valve body, which are connected to one another via connection ends, that the coupling piece and the valve body delimit a relief chamber in the area of these connection ends, and that in the open position of the high-pressure valve the relief chamber establishes a fluid-conveying connection between the pressure chamber of the hydraulic cylinder and a drain of the high-pressure valve. In the event of a critical overload, the relief chamber can quickly take up a large quantity of hydraulic fluid after the high-pressure valve is opened, which hydraulic fluid is then discharged via the drain. Because the relief chamber is located in the area of the connection ends it can be easily manufactured.

If the high-pressure valve has been moved to its open position, hydraulic fluid may unintentionally enter a chamber area delimited from the pressure area of the high-pressure cylinder by the piston. This hydraulic fluid can result in the risk of hindering a free adjustment of the piston. To be able to reliably guarantee the reliable function of the high-pressure valve, provision can be made that a drain spatially connects this area of the chamber, which the piston spatially separates from the pressure chamber of the hydraulic cylinder, to a low-pressure area. Preferably, the chamber area can, in a space-saving manner, accommodate the spring used to preload the piston.

If provision is made that a displacement sensor measures or detects the position of the piston the operating position of the high-pressure valve can be monitored. For instance, the overload situation can then be detected. After the overload situation has ended, the displacement sensor can be used to detect the closing position of the piston. The machine control system can then be prompted to return the hydraulic cylinder to its operating position.

If the pressure valve and the high-pressure valve are connected to the hydraulic cylinder to form a single unit, this unit can be easily and quickly installed or replaced in the event of damage.

Particularly preferably a control device is provided which, after the overload situation has ended and the pressure valve and the high-pressure valve have been closed, fills the hydraulic cylinder with hydraulic fluid in such a way that it is returned to its operating position, forming the crushing gap in the operating state.

The invention is explained in greater detail below based on an exemplary embodiment shown in the drawings. In the Figures:

DETAILED DESCRIPTION

Figure 1:
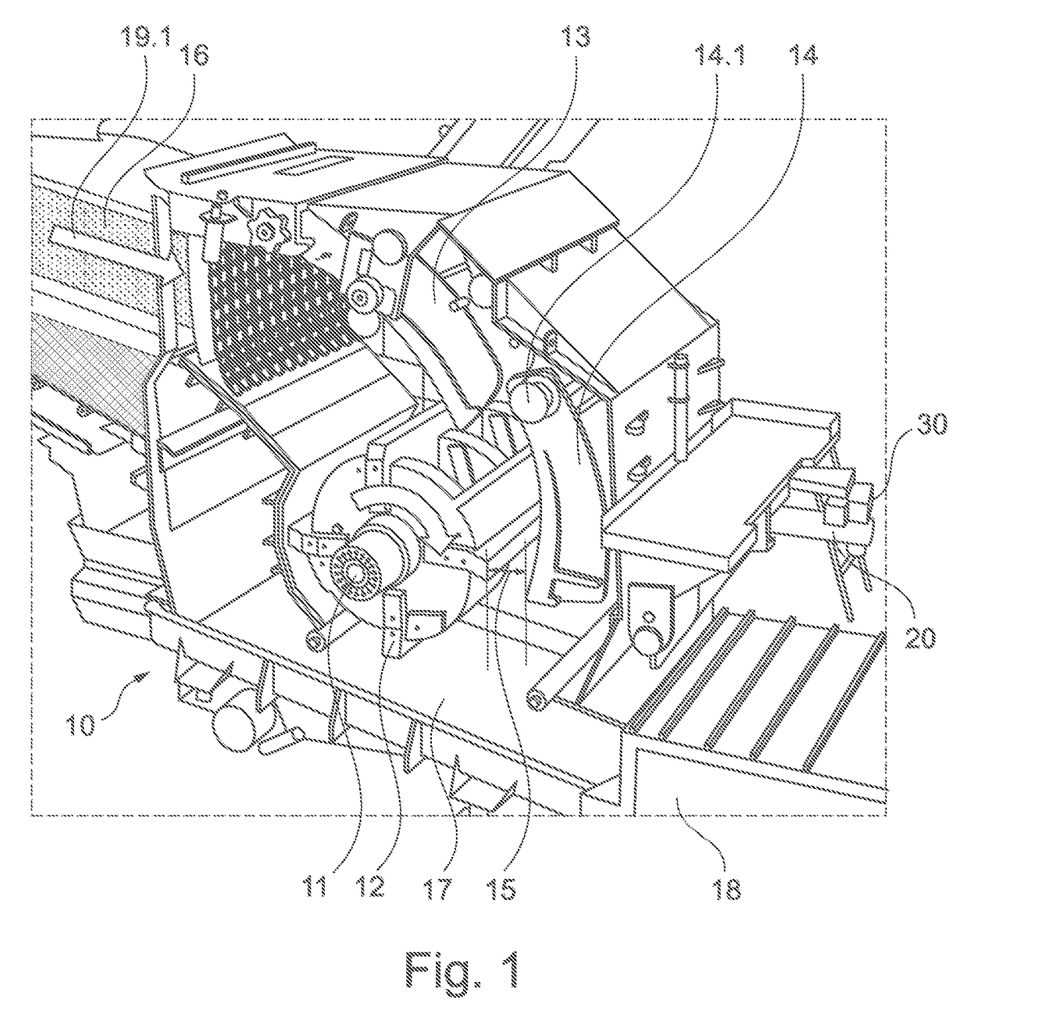
FIG. 1 shows a perspective view of a crusher unit of a rotary impact crusher.

FIG. 1 shows a crusher unit 10 of a rotary impact crusher. The crusher unit 10 comprises a crusher housing, in which a movable crusher body 11 is rotatably mounted. Accordingly, the movable crusher body 11 is designed as a rotor. The rotor bears impact bars 12 in the area of its outer circumference.

An upper impact rocker 13 is arranged inside the crusher housing. Furthermore, another crusher body 14 is also arranged in the crusher housing, which in this case forms a lower impact rocker.

A crushing gap 15 is formed between the rotor (movable crusher body 11) and the lower impact rocker (crusher body 14). When the rotor rotates, the radially outer ends of the impact bars 12 form an outer crushing circle. This crushing circle, in conjunction with a facing surface of the lower impact rocker, forms the crushing gap 15. A swivel bearing 14.1 is used to swivel mount the lower impact rocker 14. The width of the crushing gap 15 can be adjusted via the selected swivel position of the lower impact rocker.

As FIG. 1 further shows, a material feed 16 can be assigned to the crusher unit 10. This material feed 16 can be used to convey material 19.1 to be crushed into the crushing chamber. The conveying direction is symbolized by an arrow in FIG. 1. When the material 19.1 to be crushed enters the area of the rotor, the impact bars 12 fling it outwards. In this process, this material hits the upper impact rocker 13 and the lower impact rocker 14. The material to be crushed 19.1 breaks when it hits the two impact rockers.

Figure 2:
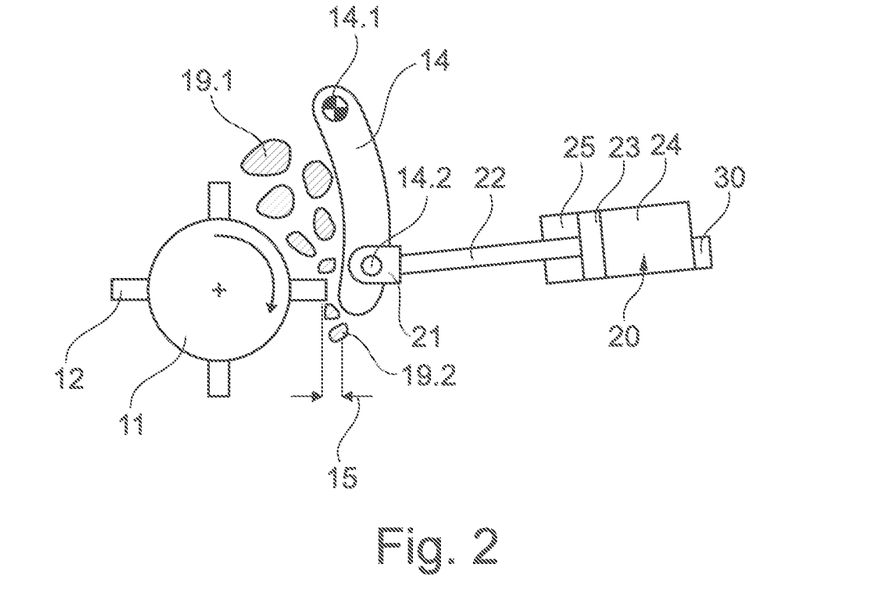
FIG. 2 shows a schematic representation of the crusher unit according to FIG. 1 having an overload triggering device when the device is not in an overload state.
Figure 3:
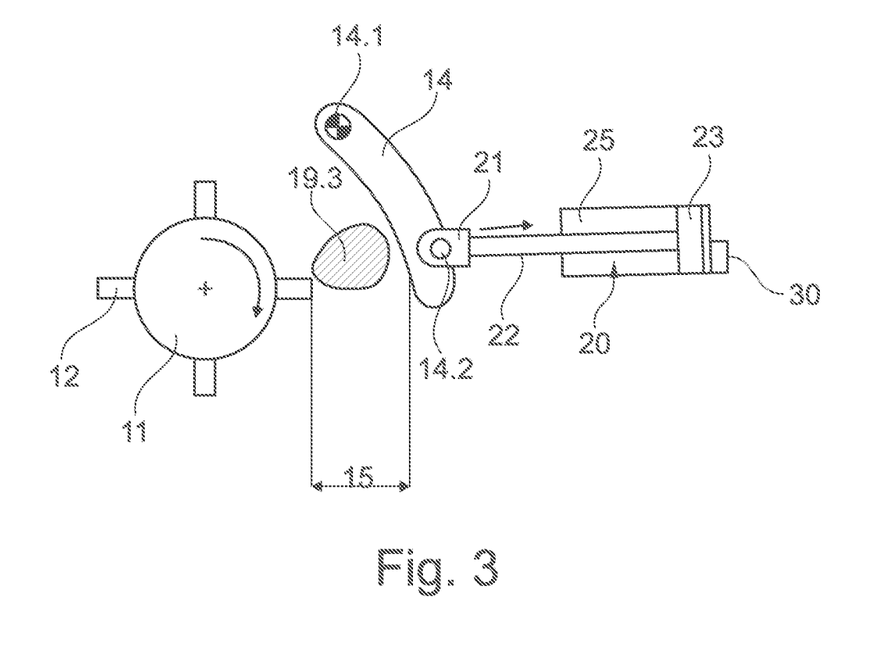
FIG. 3 shows a schematic representation of the crusher unit according to FIG. 1 having an overload triggering device when the device is in an overload state.

This is shown in more detail in FIGS. 2 and 3 by way of example of the lower impact rocker. When the material to be crushed 19.1 hits the crusher body 14, crushed material 19.2 is produced, as shown in FIG. 2. As soon as this crushed material has a grain size smaller than the crushing gap 15, this crushed material 19.2 falls through the crushing gap 15. Then it enters a collection area 17 below the movable crusher body 11 (rotor). As FIG. 1 shows, a conveyor 18 is connected to the collection area 17. This conveyor 18 can be used to remove the crushed material 19.2.

As FIG. 2 further shows, a hydraulic cylinder 20 is used to support the crusher body 14 relative to the machine structure of the crusher. The support at the machine structure, for instance at the machine frame of the crusher, is not detailed in the drawings. However, FIG. 1 shows that the hydraulic cylinder 20 is installed in a protected manner mainly outside the crusher housing in which the rotor is mounted.

As shown in FIGS. 2 and 3, the hydraulic cylinder 20 has a cylinder 25, in which a piston 23 is adjustably guided. The piston 23 bears a piston rod 22. The piston rod 22 is equipped with a coupling piece 21 at its end facing away from the piston 23, which coupling piece has a bearing part 21.1. This bearing part 21.1 is used to connect the coupling piece 21 to a bearing 14.2 of the crusher body 14. In this way, the hydraulic cylinder 20 is swivel mounted to the crusher body 14. The coupling point is at a distance from the swivel bearing 14.1.

As FIG. 2 shows, the piston 23 delimits a pressure chamber 24 in the cylinder 25. Hydraulic fluid, in particular hydraulic oil, is filled into the pressure chamber 24. The piston 23 is supported against this incompressible medium. In this way, the piston rod 22 and the crusher body 14 are held in the predetermined crushing position shown in FIG. 2.

Depending on the crushing task at hand, the operating position of the crushing gap 15 has to be adjusted accordingly. The crusher has a control device for this purpose. If, starting from the position shown in FIG. 2, the crushing gap 15 is to be widened, hydraulic fluid is drained from the pressure chamber 24. This causes the piston 23 to move further into the cylinder 25 until the desired crushing gap 15 has been set. On the other hand, if a narrower crushing gap 15 is desired, additional hydraulic fluid is added to the pressure chamber 24. This moves the piston 23 while enlarging the pressure chamber 24. The piston rod 22 continues to move out of the cylinder 25. This causes the crusher body 14 to swivel clockwise, resulting in a narrowing of the crushing gap 15.

As shown in FIGS. 1 to 3, an overload triggering device 30 is also used. This overload triggering device 30 is preferably firmly connected to the hydraulic cylinder 20.

Figure 4:
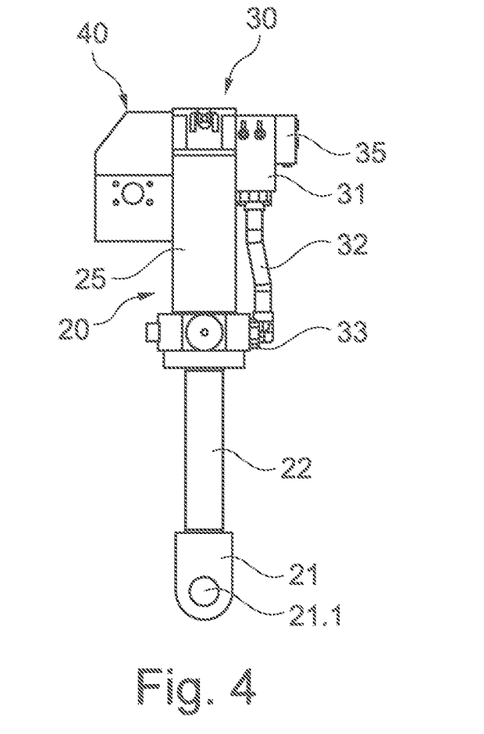
FIG. 4 shows a side view of the overload triggering device in accordance with FIGS. 2 and 3.
Figure 5:
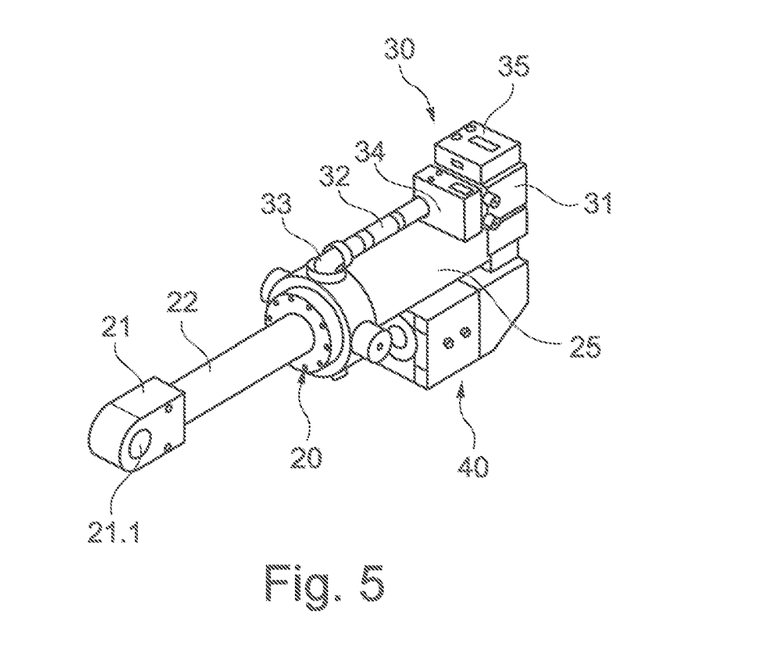
FIG. 5 shows a perspective view of the overload triggering device of FIG. 4.

FIGS. 4 and 5 show that the overload triggering device 30 includes a control block 31 holding a pressure valve. This pressure valve may be formed by a common pressure relief valve, wherein this pressure relief valve is connected on the one hand to the pressure chamber 24 and on the other hand to a low-pressure area. In this exemplary embodiment, the connection to the low-pressure area is established by a hydraulic line 32. The hydraulic line 32 is routed from the pressure valve (control block 31) to a hydraulic port 33 of the hydraulic cylinder 20. The hydraulic port 33 opens into the cylinder 25 on the end of the piston 23 facing away from the pressure chamber 24. In FIGS. 2 and 3, this is the area where the piston rod 22 is located. In addition, at least one discharge area 34 is provided, which is also spatially connected to the area of the cylinder 25 into which the hydraulic port 33 opens. This discharge area 34 can be used to route hydraulic fluid, which is displaced from the pressure chamber 24 and does not fit into the low-pressure chamber of cylinder 25 because of the volume of piston rod 22, into a hydraulic system. For instance, this displaced hydraulic fluid can be drained into a hydraulic tank via a further pressure relief valve. The pressure valve 31 (and the further pressure relief valve) may have the form of a simple check valve, acting in one direction to allow the hydraulic fluid to be drained from the pressure chamber 24.

In addition, a control element may be provided. If the piston 23 is to be reset, thereby increasing the size of pressure chamber 24, hydraulic fluid can be introduced into the control element via the hydraulic line 32 and pumped into the pressure chamber 24, bypassing the pressure valve 31. This moves the piston 23 thereby enlarging the pressure chamber 24. The control element may for instance be formed by a check valve acting against the pressure valve 31.

The pressure valve 31 is set to open at a hydraulic pressure in the pressure chamber 24 in the range from 50 bar to 100 bar, preferably in the range from 50 bar to 65 bar. This load case equals an operating situation in which short-term load peaks occur due to material 19.1 to be broken. These short-term load peaks can occur, for instance, if there is a large lump of rock in the material 19.1 to be crushed. In that case, the pressure valve 31 is triggered. The piston 23 moves a short distance into the cylinder 25, resulting in an enlargement of the crushing gap 25. The rock is then only roughly crushed.

As FIGS. 4 and 5 indicate, a high-pressure valve 40 is provided in addition to the pressure valve 31. This high-pressure valve 40 may preferably also be installed to the hydraulic cylinder 20, as indicated by FIGS. 4 and 5.

Figure 6:
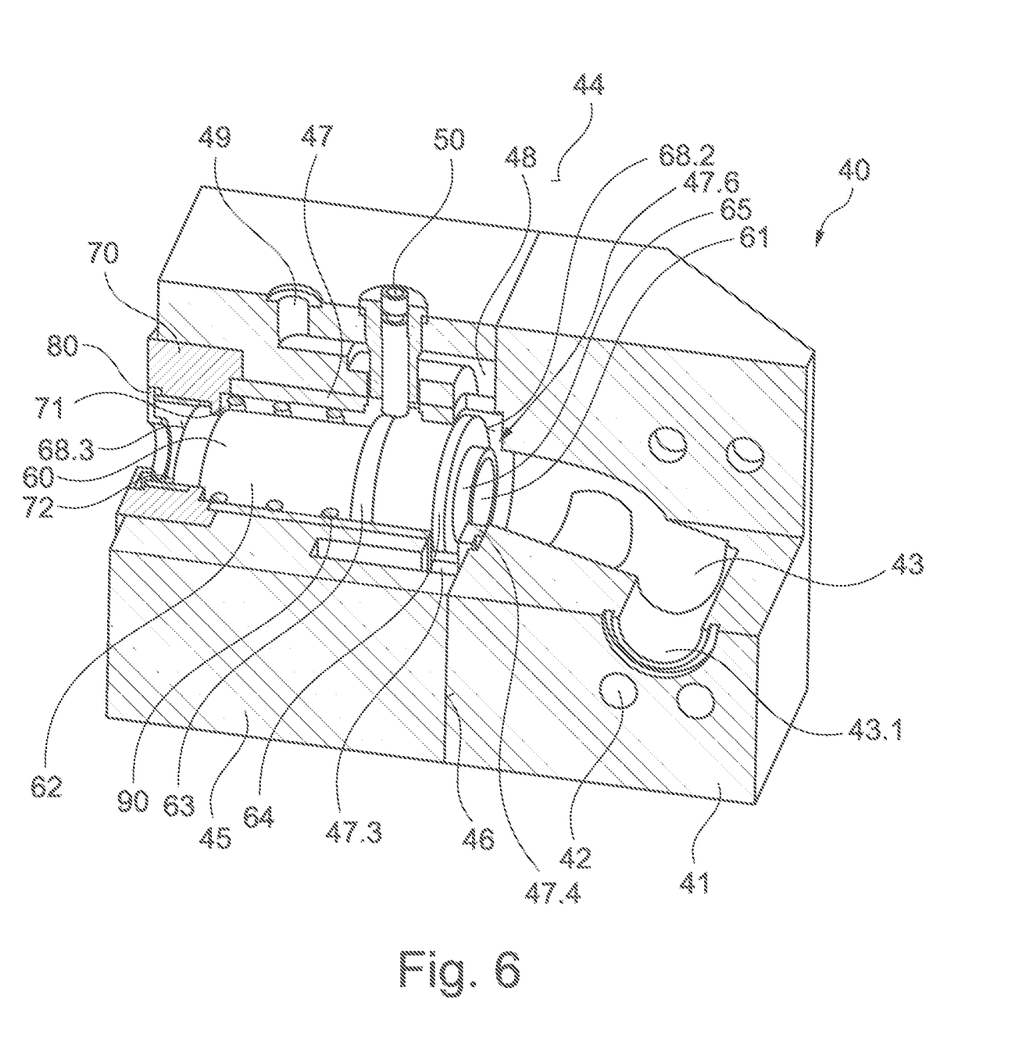
FIG. 6 shows in partial sectional view of an isometry of a high-pressure valve of the overload triggering device according to FIGS. 4 and 5.
Figure 7:
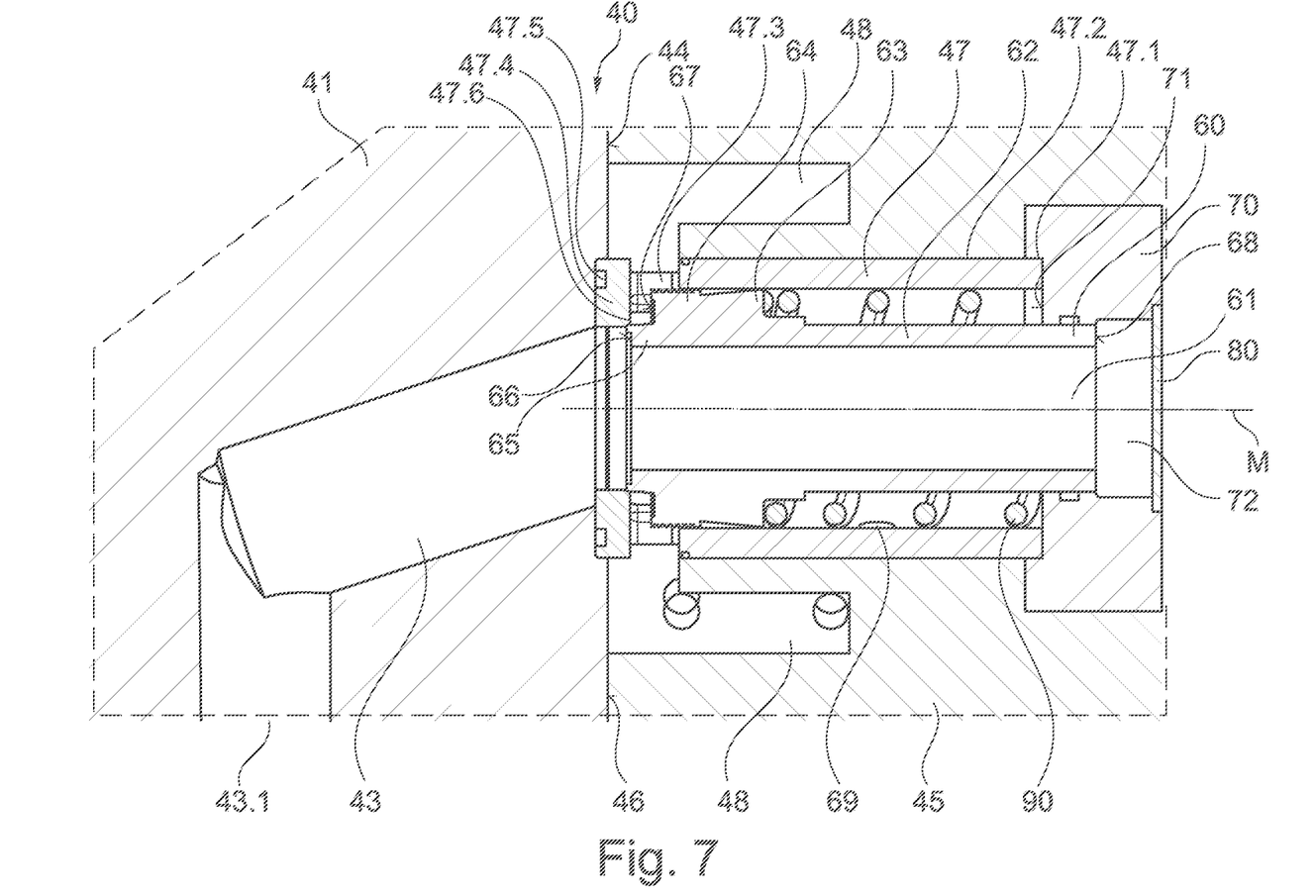
FIG. 7 shows a side view and a sectional view of the high-pressure valve of the detail according to FIG. 6.
Figure 8:
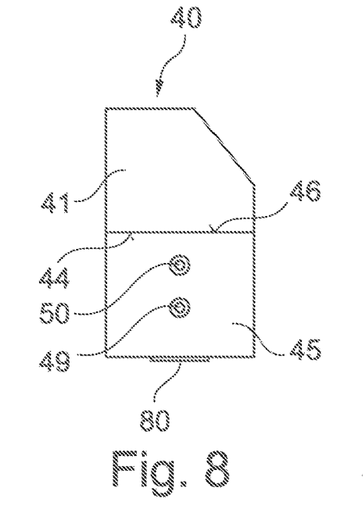
FIG. 8 shows a first representation of the high-pressure valve according to FIGS. 6 and 7.
Figure 9:
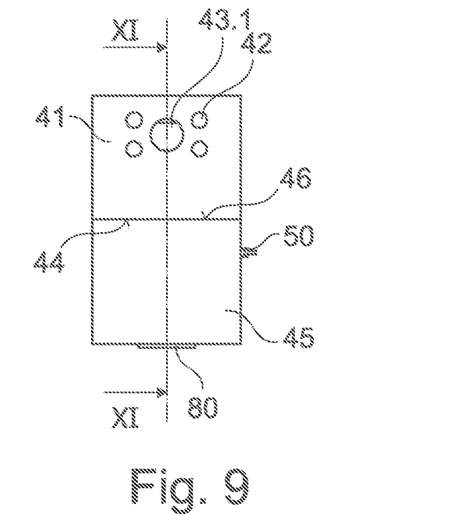
FIG. 9 shows a second representation of the high-pressure valve according to FIGS. 6 and 7.

The high-pressure valve 40 is shown in more detail in the FIGS. 6 and 7. As can be seen from these figures, the high-pressure valve 40 has a coupling piece 41 into which a pressure line 43 is incorporated. The coupling piece 41 has attachment mounts 42. In the assembled state, these attachment mounts 42 are aligned with screw mounts of the hydraulic cylinder 20. In the assembled state, the pressure line 43 is spatially connected to the pressure chamber 24 of the hydraulic cylinder 20 via an opening 43.1.

The high-pressure valve 40 has a valve body 45, which may be designed like a housing. The valve body 45 forms a connection end 46. This connection end 46 can be used to connect the valve body 45 to a connection end 44 of the coupling piece 41. The connection of the coupling piece 41 to the valve body 45 is established using screw connections not shown.

Figure 10:
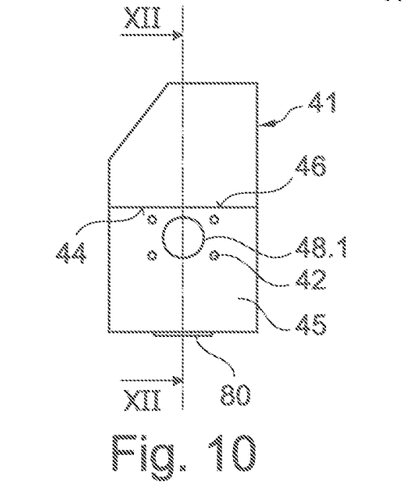
FIG. 10 shows a third representation of the high-pressure valve according to FIGS. 6 and 7.
Figure 11:
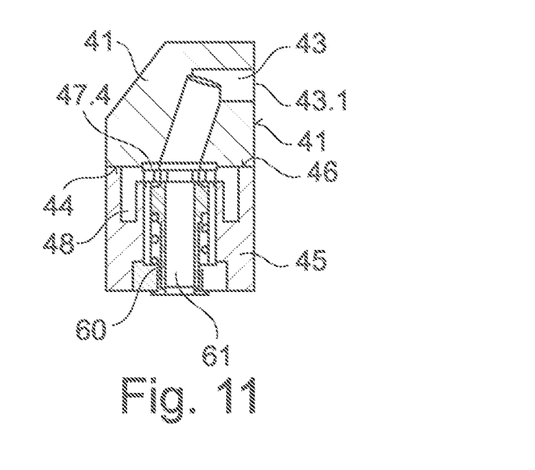
FIG. 11 shows the high-pressure valve along the section marked XI-XI in FIG. 9.
Figure 12:
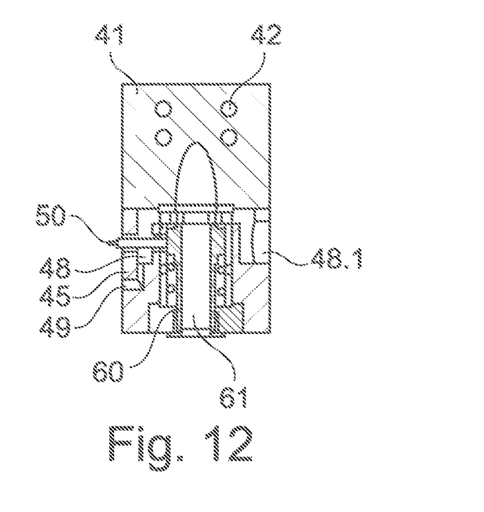
FIG. 12 shows the high-pressure valve along the section marked XII-XII in FIG. 10.

The valve body 45 has a recess in the area of its connection end 46 forming a relief chamber 48. This relief chamber 48 opens into a discharge opening 48.1, which can be seen in FIGS. 10 and 12.

The valve body 45 is provided with a mount. A guide body 47 is inserted into this mount. The guide body 47 is preferably cylindrical at its outer circumference. The mount forms an inner cylinder into which the guide body 47 is inserted in a sealed manner.

The guide body 47 encloses a mount area with an inner wall 47.2. This mount area also forms a guide surface for a piston 60, as will be discussed in more detail below. On its end facing away from the connection end 46, the guide body 47 is provided with a support section 47.1. Opposite from the support section 47.1, the guide body 47 forms a valve piece 47.4 having a valve seat 47.6. A seal 47.5 is used to seal off the guide body 47 from the coupling piece 41 in the area of the connection end 44.

As FIG. 7 shows, the guide body 47 has at least one line section 47.3 that is connected to the relief chamber 48 in a fluid-conveying manner. To mount the guide body 47, it is inserted into the valve body 45 at the end facing away from the connection end 46. The valve piece 47.4 limits the insertion motion. The valve piece 47.4 strikes against the coupling piece 41, as shown in FIG. 7.

The piston 60 can be inserted into the guide body 47. The piston 60 is provided with a guide section 64 on its outside. This guide section 64 is mainly formed by a cylindrical body, wherein sealing grooves may be formed in the outer peripheral surface of this body. The guide section 64 is held at the cylindrical inner wall 47.2 of the guide body 47 so as to be linearly adjustable in the direction of the central longitudinal axis M of the piston 60.

As FIG. 7 shows, the piston 60 has a pressure piece 65. In its closed position and thus in the closed position of the high-pressure valve 40, the pressure piece 65 of the piston is in sealing contact with the valve seat 47.6 of the guide body 47.

The piston 60 forms a first pressure surface 66 and further a second pressure surface 68. The first pressure surface 66 is preferably arranged in the area of the pressure piece 65. Further preferably, the free end of the piston 60 can form the second pressure surface 68 facing the pressure piece 65.

FIG. 7 shows that the piston 60 also has a third pressure surface 67. This third pressure surface 67 is smaller than the first pressure surface 66 arranged set back in the direction of the central longitudinal axis M of the piston 60. The third pressure surface 67 is preferably formed by the guide section 64.

When the piston 60 is installed in the guide body 47, a spring 90 can be inserted into the area between the inner wall 47.2 and a support section 62 of the piston from the end facing the connection end 46.

In this case the spring 90 is designed as a helical spring. In the assembled state, one end of the spring 90 rests against a shoulder 63 of the piston 60. The opposite end of the spring 90 rests against a support surface 71 of a spring retainer 70. In particular, the spring holder 70 can be designed as a separate component. After the piston 60, the spring 90 and guide body 47 have been installed in the valve body 45, the spring retainer 70 is moved to the mounting position shown in FIG. 7 and bolted to the valve body 45. In the assembled state, the guide body 47 rests against a support section 47.1 on the spring holder 70, preferably at the support surface 71. In this way, the spring holder 70 presses the valve piece 47.4 of the guide body 47 against the coupling piece 41. The gasket 47.5 is compressed in the process and makes for a tight seal here. The spring holder 70 preloads the spring 90 between the support surface 71 and the shoulder 63. In this way, a preloading force is introduced into the piston 60. This preloading force is used to clamp the pressure piece 65 of the piston against the valve seat 47.6 of the guide body 47 in a circumferentially sealing manner.

FIG. 7 shows that a closure 80 can also be connected to the spring holder 70 in a sealing manner. However, it is also conceivable that the fastener 80 is integrally connected to the spring holder 70.

The direction of action of the spring 90 and thus the direction of the preloading force acts along the central longitudinal axis M of the piston 60.

The first and the third pressure surfaces 66 and 67 are formed such that the projection of these pressure surfaces 66, 67 into a plane perpendicular to the preloading direction of the spring 90 form the first projected surface and the third projected surface, wherein the surface normal to these first and third projected surfaces extends opposite from the direction of opening motion of the piston 60 (from left to right in FIG. 7).

The projection of the second pressure surface 68 into a plane perpendicular to the preloading direction of the spring 90 forms a second projected surface. The surface normal to the second projected surface extends in the direction of the opening motion of the piston 60.

Now, the design of the piston 60 is such that when the piston 60 is closed, as shown in FIG. 7, the area of the first projected surface is greater than the area of the second projected surface. During the operation of the high-pressure valve 40, the pressure of the pressure chamber 24 of the hydraulic cylinder 20 is present in the pressure line 43. This pressure is present at the first pressure surface 66. Because of the penetration 61, the pressure is also present in a fluid area 72, which is formed upstream of the second pressure surface 68. In this way, this pressure also pressurizes the second pressure surface 68. Now that the projected first surface is larger than the projected second surface, the piston 60 would be lifted off the valve seat 47.6 because of the existing pressure conditions. The spring 90 counteracts this behavior. Accordingly, the preloading force of the spring 90 is selected to compensate for the force in the opening direction of the piston 60 resulting from the surface difference and, in addition, to apply a remaining preloading force that securely presses the piston 60 against the valve seat 47.6.

If a critical overload situation now occurs, the pressure in the pressure chamber 24 of the hydraulic cylinder 20 increases abruptly. This pressure is then also present at the first and the second pressure surfaces 66, 68. If the pressure exceeds a critical threshold, the high-pressure valve 40 is triggered.

Depending on the design of the rotary impact crusher, this critical pressure can be selected in the range greater than 150 bar, greater than 200 bar, greater than 250 bar or greater than 300 bar or greater than 350 bar.

When this critical pressure is applied, the resulting force acting in the opening direction of the piston 60 increases, affected by the force acting on the first and second pressure areas 66, 68. This force then becomes greater than the preloading force of spring 90. Then the piston 60 is lifted off the valve seat 47.6. The hydraulic fluid can flow out of the pressure line 43. The hydraulic fluid flows past the open valve seat 47.6 and enters the area upstream of the third pressure surface 67. There, the pressure in the hydraulic fluid causes a further increase in the force acting on the piston 60 in the opening direction of the piston 60. This additional force causes the high-pressure valve 40 to open quickly.

The hydraulic fluid can flow past the third pressure surface 67. In this way it enters the low-pressure range. The hydraulic fluid then enters the relief chamber 48 via the line section 47.3 and can flow off through the discharge opening 48.1.

Preferably, the outflowing hydraulic fluid is collected and returned to the hydraulic system, for instance using a tank and a pump.

When the high-pressure valve 40 is triggered in this way, the piston 23 of the high-pressure cylinder 20 is pushed into the cylinder 25, reducing the size of the pressure chamber 24. In doing so, a large amount of hydraulic fluid is displaced from the cylinder 25 in a short period of time. This results in a rapid and wide enlargement of the crushing gap 15. This situation is shown in FIG. 3. The non-breakable object 19.3 has caused the overload situation. The high-pressure valve 40 has been triggered and the crusher body 14 has been adjusted to form a maximum crushing gap width. Now the unbreakable object 19.3 can fall out of the crushing gap 15.

Once the non-breakable object 19.3 has fallen out of the crushing gap 15, the overload situation is no more. The piston 23 in the high-pressure cylinder 20 is no longer loaded by the non-breakable object 19.3. The pressure in the pressure chamber 24 decreases. This results in both the high-pressure valve 40 and the possibly triggered pressure valve 31 closing. When these two valves are closed, the machine control system can cause the pressure chamber 24 of the hydraulic cylinder 20 to be refilled until it reaches its initial position (FIG. 2) in the operating position.

FIG. 6 shows a design variant in which a bracing element displacement sensor 50 is mounted at the high-pressure valve 40. The displacement sensor 50 may, for instance, be an inductive sensor. The displacement sensor 50 can determine or detect the position of the piston 60. This information can be evaluated in the machine control system. Additionally or alternatively, a measuring port 49 may also be provided for further parameters, such as a pressure gauge or a temperature gauge. The pressure gauge measures the pressure in the relief chamber 48.

As FIG. 7 shows, a chamber is formed between the guide body 47 and the piston 60, in which the spring 90 is arranged. This chamber is further delimited by the guide section 64, which can extend along the inner wall 47.2 in a sealed manner. If no seal is provided here, or if high demands are not placed on the seal, it can happen that hydraulic fluid enters the chamber when the high-pressure valve 40 is triggered. This would impede the free adjustability of the piston 60. For this reason, a drain 69 is provided that is routed out of the chamber and into a low-pressure area. Any accumulating hydraulic fluid can then be drained.

The invention claimed is:

1. A crusher unit of a crusher for mineral materials or recycled materials, the crusher unit comprising:
    a first crusher body;
    a second crusher body arranged relative to the first crusher body such that a crushing gap is formed between the first crusher body and the second crusher body; and
    an overload triggering device coupled to the first crusher body or the second crusher body, the overload triggering device configured to permit a motion of the coupled crusher body such that a width of the crushing gap increases, the overload triggering device including:
        a hydraulic cylinder including a piston and a pressure chamber delimited by the piston;
        a pressure valve configured to be in an open position in response to a pressure in the pressure chamber equal to or greater than a first triggering pressure, the open position establishing a first fluid-conveying connection between the pressure chamber and a first low-pressure area, and the pressure valve configured to be in a closed position that blocks the first fluid-conveying connection when the pressure in the pressure chamber is below the first triggering pressure;
        a high-pressure valve configured to be in an open position in response to a pressure in the pressure chamber equal to or greater than a second triggering pressure, the open position establishing a second fluid-conveying connection between the pressure chamber and a second low-pressure area, and the high-pressure valve configured to be in a closed position blocking the second fluid-conveying connection when the pressure in the pressure chamber is below the second triggering pressure; and
        wherein the first triggering pressure is lower than the second triggering pressure.

2. The crusher unit of claim 1, wherein the first triggering pressure is ≤100 bar and the second triggering pressure is ≥150 bar.

3. The crusher unit of claim 1, wherein:
    the open position of the pressure valve adjusts the coupled crusher body to result in a first increase in the width of the crushing gap;
    the open position of the high-pressure valve adjusts the coupled crusher body to result in a second increase in the width of the crushing gap; and
    the first increase in width is smaller than the second increase in width.

4. The crusher unit of claim 3, wherein:
    a ratio of the first increase in width to the second increase in width is ≤0.5.

5. The crusher unit of claim 3, wherein:
    a ratio of the first increase in width to the second increase in width is ≤0.25.

6. The crusher unit of claim 1, wherein:
    the pressure valve moving to the open position causes a first quantity of hydraulic fluid to enter the first low-pressure area through the first fluid-conveying connection;
    the high-pressure valve moving to the open position causes a second quantity of hydraulic fluid to enter the second low-pressure area through the second fluid-conveying connection; and
    the first quantity is smaller than the second quantity.

7. The crusher unit of claim 6, wherein:
    a ratio of the first quantity to the second quantity is ≤0.5.

8. The crusher unit of claim 6, wherein:
    a ratio of the first quantity to the second quantity is ≤0.25.

9. The crusher of claim 1, wherein the high-pressure valve further comprises:
    a piston including a pressure piece, the piston of the high-pressure valve being configured to adjust between a closed position and an open position;
    a spring configured to apply a spring-preload biasing the piston of the high-pressure valve toward the closed position; and
    a valve seat configured such that the pressure piece presses against the valve seat in a sealed manner when the piston of the high-pressure valve is in the closed position.

10. The crusher unit of claim 9, further comprising:
    a displacement sensor configured to measure or detect a position of the piston of the high-pressure valve.

11. The crusher unit of claim 9, wherein the piston of the high-pressure valve further comprises:

a first and a second pressure surface configured to receive pressure from the pressure chamber of the hydraulic cylinder when the high-pressure valve is in the closed position, the first pressure surface facing away from a direction of an opening motion of the piston of the high-pressure valve, and the second pressure surface facing in the direction of the opening motion of the piston of the high-pressure valve;

wherein a first projected surface formed by a projection of the first pressure surface in a plane perpendicular to a preloading direction of the spring has a first surface area; and wherein a second projected surface formed by a projection of the second pressure surface in a plane perpendicular to the preloading direction of the spring includes a second surface area smaller than the first surface area.

12. The crusher unit of claim 11, wherein:
the piston of the high-pressure valve includes a penetration establishing a spatial connection between the first pressure surface and the second pressure surface.

13. The crusher unit of claim 9, wherein the piston of the high-pressure valve further comprises:
at least one first pressure surface configured to receive pressure from the pressure chamber of the hydraulic cylinder when the high-pressure valve is in the closed position, wherein a first projected surface formed by a projection of the at least one first pressure surface in a plane perpendicular to a preloading direction of the spring faces away from an opening direction of the piston of the high-pressure valve;
at least one other pressure surface on the piston, wherein another projected surface formed by a projection of the at least one other pressure surface in a plane perpendicular to the preloading direction of the spring faces away from the opening direction of the piston of the high-pressure valve; and
wherein the hydraulic pressure in the pressure chamber of the hydraulic cylinder is not present at the at least one third other pressure surface when the high-pressure valve is in the closed position, and a spatial connection is established between the at least one other pressure surface and the pressure chamber of the hydraulic cylinder when the high-pressure valve is in the open position.

14. The crusher unit of claim 9, wherein:
the high-pressure valve includes a valve body including a spring holder;
the spring is a helical spring having a first end and a second end; and
the piston of the high-pressure valve is received in the valve body and includes a support section and a shoulder, the helical spring being received on the support section with the first end of the helical spring supported on the shoulder and the second end of the helical spring supported on the spring holder.

15. The crusher unit of claim 9, wherein:
the piston of the high-pressure valve includes a guide section; and the high-pressure valve includes a guide body including an inner wall configured to guide the guide section of the piston of the high-pressure valve in a sealed manner.

16. The crusher unit of claim 15, wherein:
the high-pressure valve includes a valve body;
the guide body is received in the valve body and includes a valve piece, the valve seat being defined on the valve piece; and
the guide body forms at least one line section configured such that when the piston of the high-pressure valve is in the open position, hydraulic medium flows out of the pressure chamber through the at least one line section.

17. The crusher unit of claim 15, wherein:
the piston of the high-pressure valve includes a support section;
the inner wall of the guide body is spaced apart from the support section of the piston of the high-pressure valve to form a spaced-apart area; and
the spring is mounted in the spaced-apart area.

18. The crusher unit of claim 1, wherein the high-pressure valve further comprises:
a drain;
a coupling piece including a first connection end;
a valve body including a second connection end connected to the first connection end; and
a relief chamber delimited by the coupling piece and the valve body in the area of the first and second connection ends, the relief chamber establishing a fluid-conveying connection between the pressure chamber of the hydraulic cylinder and the drain when the high-pressure valve is in the open position.

19. The crusher unit of claim 9, wherein:
the piston of the high-pressure valve spatially delimits a spatial area with respect to the pressure chamber of the hydraulic cylinder, the spatial area being spatially connected to a further low-pressure area by a drain of the high-pressure valve; and
the spring is mounted in the spatial area.

20. The crusher unit of claim 1, wherein the hydraulic cylinder further comprises:
a piston rod coupled to the piston; and
a coupling piece creating a swivel coupling between the piston rod and the coupled crusher body.

21. The crusher unit of claim 1,
wherein the pressure valve and the high-pressure valve are connected to the hydraulic cylinder to form a structural unit.

22. The crusher unit of claim 1, further comprising:
a control device configured such that when the pressure valve and the high-pressure valve are in the closed positions after the pressure has decreased below the first and second triggering pressures, the control device fills the hydraulic cylinder with hydraulic fluid such that the piston moves in the hydraulic cylinder such that the width of the crushing gap decreases.

* * * * *

UNITED STATES PATENT AND TRADEMARK OFFICE
CERTIFICATE OF CORRECTION

PATENT NO. : 11,779,932 B2
APPLICATION NO. : 17/325455
DATED : October 10, 2023
INVENTOR(S) : Gerd Meyer et al.

It is certified that error appears in the above-identified patent and that said Letters Patent is hereby corrected as shown below:

In the Specification

Column 2, Line 51:
Add -- $\leq$ -- before "100"

Column 2, Line 52:
Add -- $\geq$ -- before "200"

Column 3, Line 14:
Add -- $\leq$ -- before "0.5"

Column 3, Line 15:
Add -- $\leq$ -- before "0.25"

Column 3, Line 33:
Add -- $\leq$ -- before "0.5"

Column 3, Line 34:
Add -- $\leq$ -- before "0.25"

In the Claims

Column 13, Line 40:
"third" should be deleted

Signed and Sealed this
Twenty-sixth Day of December, 2023

Katherine Kelly Vidal
*Director of the United States Patent and Trademark Office*